K. ZIEGLER.
HANDSAW.
APPLICATION FILED JULY 13, 1908.
938,105.
Patented Oct. 26, 1909.
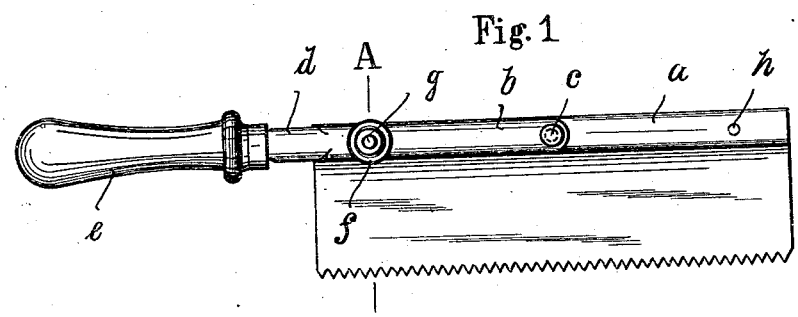
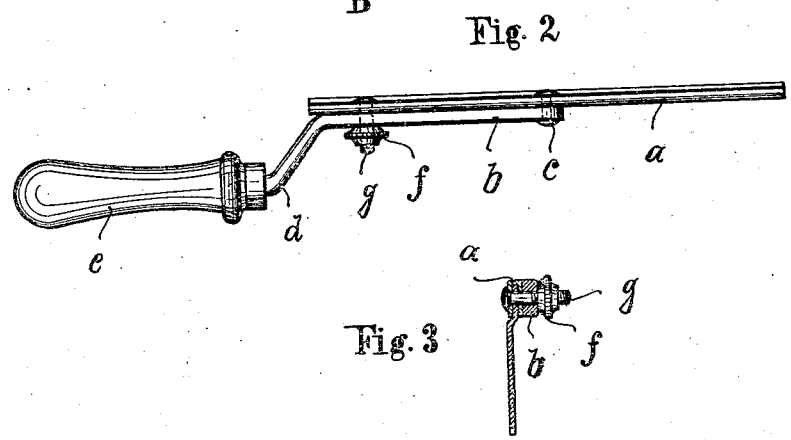
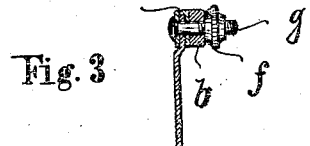
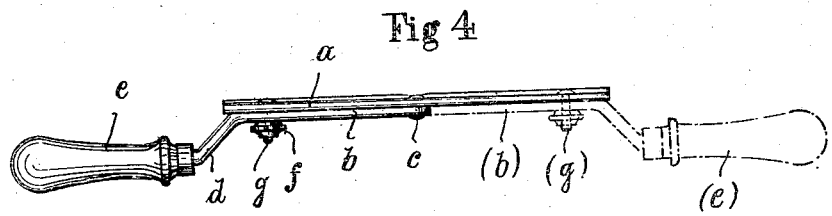
Witnesses:
Gg. Beckert
A. Heerlein
Inventor:
Karl Ziegler
by B. Singer
Attorney

UNITED STATES PATENT OFFICE.

KARL ZIEGLER, OF NUREMBERG, GERMANY.

HANDSAW.

938,105. Specification of Letters Patent. Patented Oct. 26, 1909.

Application filed July 13, 1908. Serial No. 443,258.

*To all whom it may concern:*

Be it known that I, KARL ZIEGLER, whose post-office address is No. 121 Landgrabenstrasse, at Nuremberg, Bavaria, Germany, have invented certain new and useful Improvements in Handsaws; and I do hereby declare the following to be a full, clear, and exact description of the invention, such as will enable others skilled in the art to which it appertains to make and use the same.

This invention relates to hand saws, intended more particularly for enabling parts projecting from a plane surface to be sawed off flush with said plane surface, the invention consisting in providing an improved saw in which the handle can be removed from and shifted to either end of the saw blade as desired. This capability of shifting the handle to either end of the saw blade as required, increases the utility of the saw very considerably, because such a saw can now be used, according to the position of the handle, to make cuts from right to left as well as from left to right. The teeth of the saw may act upon the part to be cut from above or from below according to circumstances.

This invention may be carried out in various ways.

One way of carrying out this invention is illustrated by way of example in the accompanying drawing in which—

Figure 1 is a side elevation and Fig. 2 is a plan of the saw, with the handle at one end of the saw blade. Fig. 3 illustrates a detail. Fig. 4 is a view similar to Fig. 2, indicating the position of the handle when shifted to the other end of the saw blade.

$a$ is the frame of the saw, $b$ is the handle bar pivoted at one end to the frame $a$ by means of a rivet $c$ situated in the middle of the length of the saw blade. The other end of the bar $b$ is bent to one side to form a cranked arm $d$, that carries the handle $e$.

$f$ is a screw passing through both the frame $a$ and the bar $b$ and provided with a nut $g$ for fixing the bar $b$ rigidly to the frame $a$.

For the purpose of enabling the saw to be conveniently operated by a right-handed as well as by a left-handed person, or of enabling one and the same person to use the saw for cutting in either direction, it is merely necessary to remove the nut and screw $g$ and to turn the handle $e$, with its bar $b$ through 180 degrees, that is to say to shift the handle to the opposite end of the saw blade as indicated by dotted lines in Fig. 4, fixing it in that position by means of the nut and screw as before. For this purpose the frame $a$ is provided with a corresponding hole $h$ to receive the screw.

It is to be understood that the essence of this invention consists in the reversibility of the handle, and that this invention is not limited to any particular method of effecting this reversibility.

What I claim and desire to secure by Letters Patent is:

In combination, a saw blade provided on one of its longitudinal margins with saw teeth and having its opposite longitudinal margin laterally offset throughout its length to afford on one side of the blade a continuously free and unobstructed surface, a handle pivotally secured centrally to the offset margin and disposed wholly on that side opposite to the free surface of the blade, and means for securing the handle in reverse positions on the blade to dispose the handle portion at either end thereof.

In testimony whereof I affix my signature in presence of two witnesses.

KARL ZIEGLER.

Witnesses:
ALEX. WIELE,
HANS BÖRBER.